No. 747,012. PATENTED DEC. 15, 1903.
E. Z. SMITHPETER.
BREAST AND POLE STRAP FASTENER.
APPLICATION FILED AUG. 28, 1902.
NO MODEL.
2 SHEETS—SHEET 2.

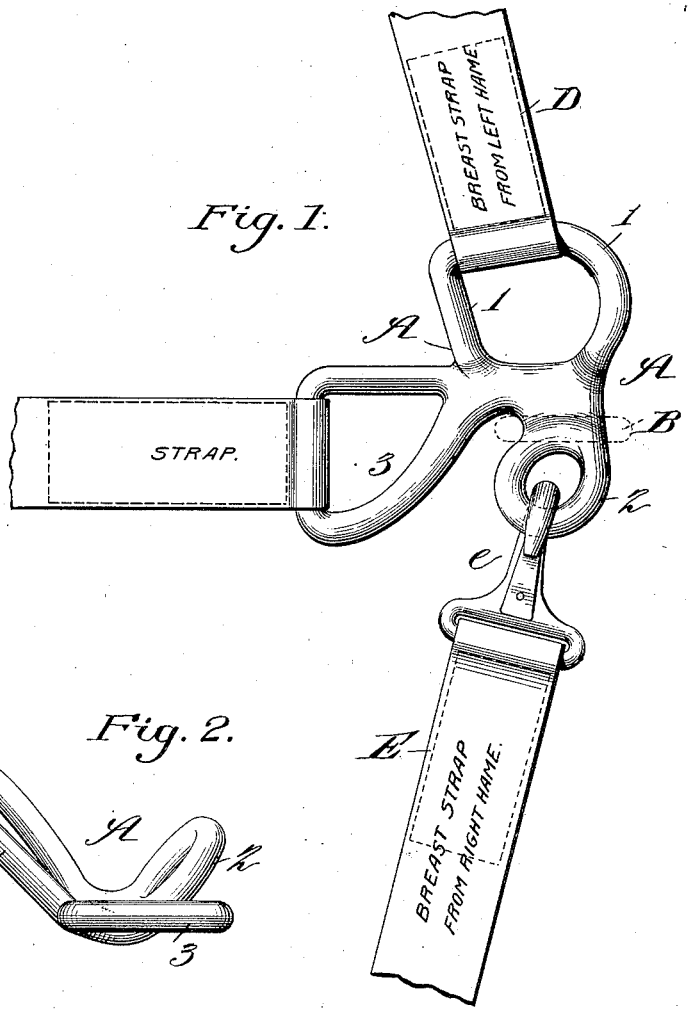

WITNESSES:
Jos. A. Ryan
Amos W Hart

INVENTOR
Ely Z. Smithpeter
BY Munn & Co.
ATTORNEYS.

No. 747,012. Patented December 15, 1903.

UNITED STATES PATENT OFFICE.

ELY ZEBULON SMITHPETER, OF BOGARD, MISSOURI.

BREAST AND POLE STRAP FASTENER.

SPECIFICATION forming part of Letters Patent No. 747,012, dated December 15, 1903.

Application filed August 28, 1902. Serial No. 121,390. (No model.)

*To all whom it may concern:*

Be it known that I, ELY ZEBULON SMITHPETER, a citizen of the United States, and a resident of Bogard, in the county of Carroll and State of Missouri, have made certain new and useful Improvements in Neck-Yoke Attachments, of which the following is a specification.

The usual means for connecting harness with the neck-yoke of a lumber or other heavy wagon is a breast-strap which passes through a ring on the neck-yoke, its ends being attached to the hames of a collar, the said strap being thus bent at an acute angle where it passes through the neck-yoke ring, so that it is subject to great strain and rapid wear at that point. I have devised an improvement whereby advantages are obtained in respect to wear and ease and rapidity of hitching and unhitching the team.

The details of construction, arrangement, and operation are as hereinafter described, reference being had to accompanying drawings, in which—

Figure 3:
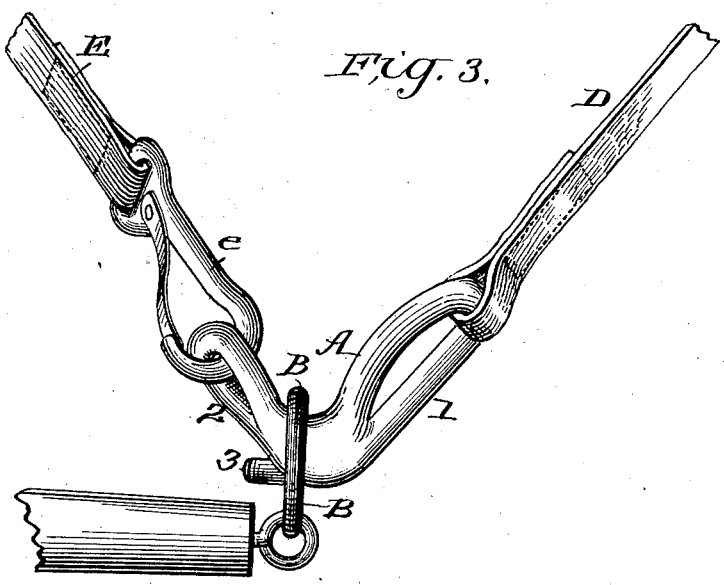
Figure 4:
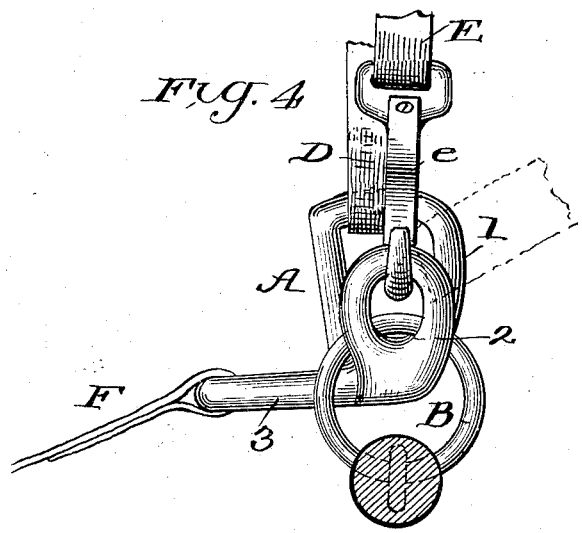

Figure 1 is a plan view of my improved coupling with breast and pole straps attached. Fig. 2 is a perspective view of the coupling device. Fig. 3 is a front view representing the accompanying device connected with a neck-yoke and breast-straps. Fig. 4 is a side view of the parts shown in Fig. 3.

In the several figures, A indicates the coupling device, which is attached to the ring B of a neck-yoke C, and D and E indicate, respectively, the breast-straps, which in practice extend to the left and right hames of the collar on the near horse. It will be understood that these straps D and E may be attached to the rings on the hames in any preferred manner. The coupling device is constructed of metal having due tensile strength and rigidity, and comprises three loops 1, 2, and 3, which are arranged practically in triangular relation. The loops 1 and 2, with which the breast-straps D and E are connected, are bent upward at an acute angle to each other, while the loop 3, to which the pole or holdback strap F is secured, projects rearward. The left-hand breast-strap D may be permanently attached to the large loop 1. The latter is straight on its inner side, but curved on its outer or front side, as shown in Fig. 4, which allows the loop of the left-hand breast-strap D to slide around into the position indicated by dotted lines, Fig. 4, when the coupling, with the attached strap F, is suspended from the left hame of the collar, as when the team is unhitched.

The loop 2 is made much smaller than the loop 1—say about one-half the size thereof—and the right-hand breast-strap E is detachably connected therewith by means of a snap-hook e. When the coupling A is applied to the neck-yoke ring B, as shown in Figs. 3 and 4, the small loop 2 is passed through said ring, which slides into place in the angle of the two loops 1 and 2 and is directly in line with the rear loop 3, to which the holdback-strap is attached. The snap-hook e is designed to be of such size as to prevent the neck-yoke ring B from sliding over it, and thus becoming detached from the coupling proper. As shown, the coupling A is a permanent attachment of the left-hand breast-strap D and the holdback-strap F. It will be understood that the latter will in practice be provided, as usual, with a loop at its rear or inner end, through which the girth or belly-band of the harness will pass, the said strap thus extending from the girth between the front legs of the horse and over the breast of the same in the usual way. The neck-yoke ring B being in line with said strap F, as before stated, it is apparent that the tension or draft applied in holding back is also in a direct line. In hitching up, the girth is passed through the rear loop on the holdback-strap F, and the small loop 2 of the coupling A being passed through the neck-yoke ring B the snap-hook is immediately engaged with said loop, as shown in Figs. 3 and 4. For unhitching it is obvious that it is simply necessary to detach the snap-hook from the loop 2 of the coupling, when the latter will fall out of the ring B and remain suspended from the left hame of the near horse, with the holdback-strap F attached. It is to be understood that when the coupling device A is used on the off horse of a team and its large and small loops 1 and 2 are reversed from the position indicated in the drawings the larger loop will be on the outside and the smaller loop on the inside, or nearer to the neck-yoke.

Having thus described my invention, what

I claim as new, and desire to secure by Letters Patent, is—

1. The combination, with the neck-yoke, and a ring secured thereto, of the attachment comprising a metal coupling device consisting of three loops, two of which are arranged projecting upward at an angle to each other and in front of the third loop, which is relatively horizontal, and breast-straps and a pole-strap attached to the respective loops, one of said breast-straps having a detachable connecting device, substantially as shown and described.

2. As an improved article of manufacture, the coupling device having two loops, 1 and 2, arranged directly opposite each other and projecting upward at an acute angle, and one of them made of less dimensions than the other, to adapt it to pass through the ring of a neck-yoke, and a third loop 3, projecting rearward horizontally from the junction with the two first-named loops, all being constructed integrally, as shown and described.

3. The improved coupling device for the purpose specified, comprising a rear loop, and two other loops projecting upward at an acute angle to each other, one of them having a straight rear side and a curved front side, substantially as shown and described.

ELY ZEBULON SMITHPETER

Witnesses:
SAMUEL W. VAUGHN,
D. C. SUGG.